(12) United States Patent
Hsu (10) Patent No.: US 7,509,531 B2
(45) Date of Patent: *Mar. 24, 2009

(54) DATA TRANSMISSION PORTS WITH DATA-INTEGRITY TRANSACTION CONTROLLING UNIT AND METHOD FOR PERFORMING THE SAME

(75) Inventor: R-Ming Hsu, Jhudong Township, Hsinchu County (TW)

(73) Assignee: Silicon Integrated Systems Corp., Hsin-Chu (TW)

(*) Notice: Subject to any disclaimer, the term of this patent is extended or adjusted under 35 U.S.C. 154(b) by 758 days.

This patent is subject to a terminal disclaimer.

(21) Appl. No.: 11/000,051

(22) Filed: Dec. 1, 2004

(65) Prior Publication Data

US 2006/0126508 A1   Jun. 15, 2006

(51) Int. Cl.
*G06F 11/00* (2006.01)
(52) U.S. Cl. .................. 714/17; 714/18; 714/749; 710/104; 710/116
(58) Field of Classification Search .................. 714/18, 714/17, 748, 749; 710/29, 37, 38, 104, 116
See application file for complete search history.

(56) References Cited

U.S. PATENT DOCUMENTS

| | | | | |
|---|---|---|---|---|
| 4,177,511 | A * | 12/1979 | Taddei | 710/37 |
| 5,046,039 | A * | 9/1991 | Ugajin et al. | 710/56 |
| 5,941,971 | A * | 8/1999 | Carter | 710/311 |
| 6,046,817 | A * | 4/2000 | Brown et al. | 358/1.16 |
| 6,480,926 | B2 * | 11/2002 | Saze et al. | 710/316 |
| 6,510,471 | B1 * | 1/2003 | Alvarez et al. | 710/33 |
| 6,760,793 | B2 * | 7/2004 | Kelley et al. | 710/52 |
| 6,993,032 | B1 * | 1/2006 | Dammann et al. | 370/395.7 |
| 7,080,174 | B1 * | 7/2006 | Thorsbakken et al. | 710/112 |
| 7,127,638 | B1 * | 10/2006 | Sardella et al. | 714/15 |
| 7,130,909 | B2 * | 10/2006 | Yamashita et al. | 709/226 |
| 7,349,406 | B1 * | 3/2008 | Robins et al. | 370/395.41 |
| 7,441,055 | B2 * | 10/2008 | Wagh et al. | 710/29 |
| 2003/0172335 | A1 * | 9/2003 | Das Sharma | 714/746 |

OTHER PUBLICATIONS

Multiplexer, Oct. 15, 2004, Wikipedia, the free encylopedia.*

* cited by examiner

*Primary Examiner*—Joshua A Lohn

(57) ABSTRACT

The present invention discloses re-configurable data transmission ports with data-integrity transaction controlling unit in a computerized computer and the method for performing the same. The controlling unit further includes a port-configuration detecting mechanism and a buffer-configuration subunit. The port-configuration detecting mechanism can inspect configuration status of all of the first ports on variance of data transmission bandwidths, e.g. "merge" or "spilt" status. The buffer-configuration subunit upon different configuration status of each first port configures each retry buffer. When a specific first port is configured on "merge" status, the buffer-configuration subunit can follows up to configure the retry buffer owned by the specific first port and the retry buffers owned but disused by the other first ports to constitute a buffer group with merging of storing spaces of said configured retry buffers. The controlling unit sequentially backs up a data on the buffer group upon the data is transmitted from the specific first port to a corresponding second port.

If the specific first port receives a non-acknowledge (NAK) message or nothing from the corresponding second port within a specific time, the data is retransmitted from the buffer group to the corresponding second port. If the specific first port exactly receives an acknowledge (ACK) message from the corresponding second port, the data is cleaned from the buffer group.

19 Claims, 10 Drawing Sheets

DATA TRANSMISSION PORTS WITH DATA-INTEGRITY TRANSACTION CONTROLLING UNIT AND METHOD FOR PERFORMING THE SAME

BACKGROUND OF THE INVENTION

1. Field of the Invention

The present invention relates to data transmission ports of a computerized system and more particularly in re-configurable data transmission ports with data-integrity transaction controlling unit and method for performing the same for data integrity support.

2. Description of the Prior Art

As known, recently a re-configurable transmission port technology is being widely utilized in input/output ports of a computerized system, which are respectively connected with I/O buses, e.g. a PCI Express. Conception of such re-configurable transmission port means that a data transmission port is capable of being reconfigured into either a "split" status as illustrated in FIG. 1 or a "merge" status as illustrated in FIG. 2, by way of implementation of a presetting software or a auto-detection for different bandwidth requirements.

Figure 1A:
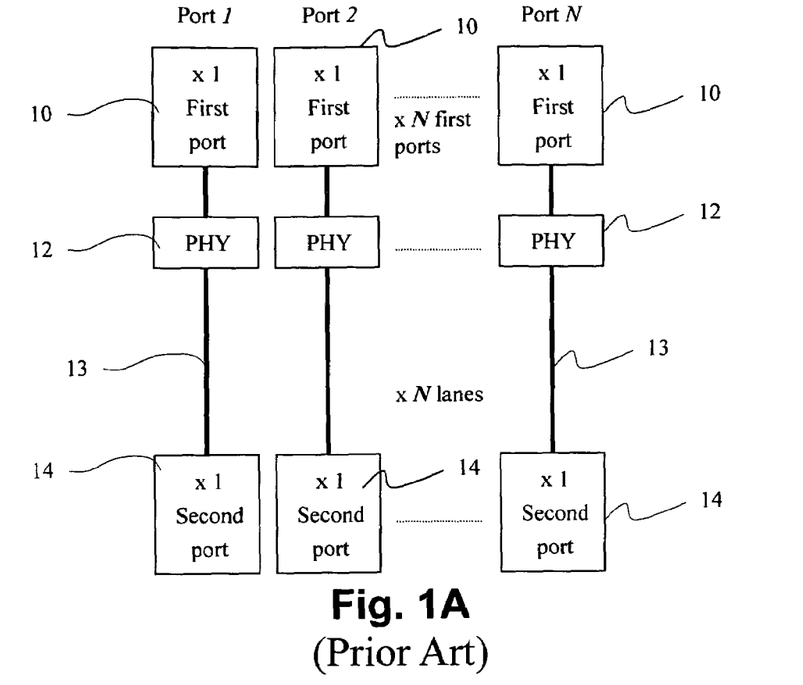
FIG. 1A illustrates a schematic diagram of data transaction between a plurality of first and second data transmission ports of a computerized system according to the prior art, which presents configuration of each first port on "split" status.
Figure 1B:
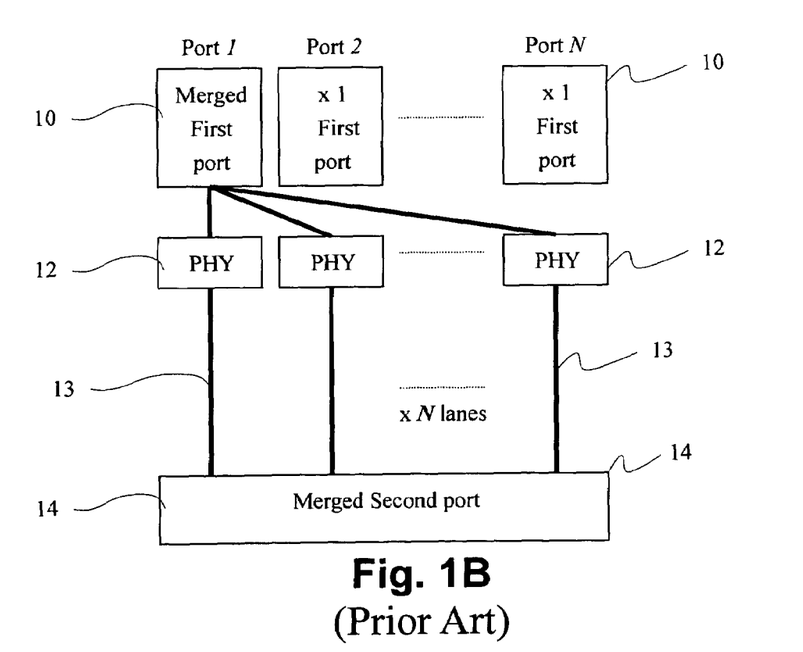
FIG. 1B illustrates a schematic diagram of data transaction between the plurality of first and second data transmission ports according to illustration of FIG. 1A, which presents reconfiguration of some of the first ports on "merge" status.

Referring to FIG. 1A, a plurality of first and second ports 10, 14 in a computerized system respectively implement data transaction with each other via a physical layer (PHY) 12 and a transmission line 13. As soon as each of the first ports 10 are configured on the "split" status ("x 1" means "one port" and "x N" means "N ports"), the plurality of first ports 10 are divided into "N" first ports each with lower individual bandwidth respectively connected to N second port. Oppositely referring to FIG. 1B, as soon as some/all of the first ports 10, e.g. first ports 1~N are configured on the "merge" status, one of the first ports 10, e.g. first port 1, is merged with multi-bandwidths of the other first ports 10, e.g. first ports 2~N, and controls transmission lines and PHY 12 of the other first ports 10. The merged bandwidth of the first port 1 shown in FIG. 1B is higher than individual bandwidth of each first port 1~N configured on split status shown in FIG. 1A and therefore capable of transmitting more data. Each of the first ports can be reconfigured with variance of bandwidth upon different data transmission requirement. This functions with more flexibility on usage of each PHY 12 and fixed transmission line 13 on data transaction.

Figure 2:
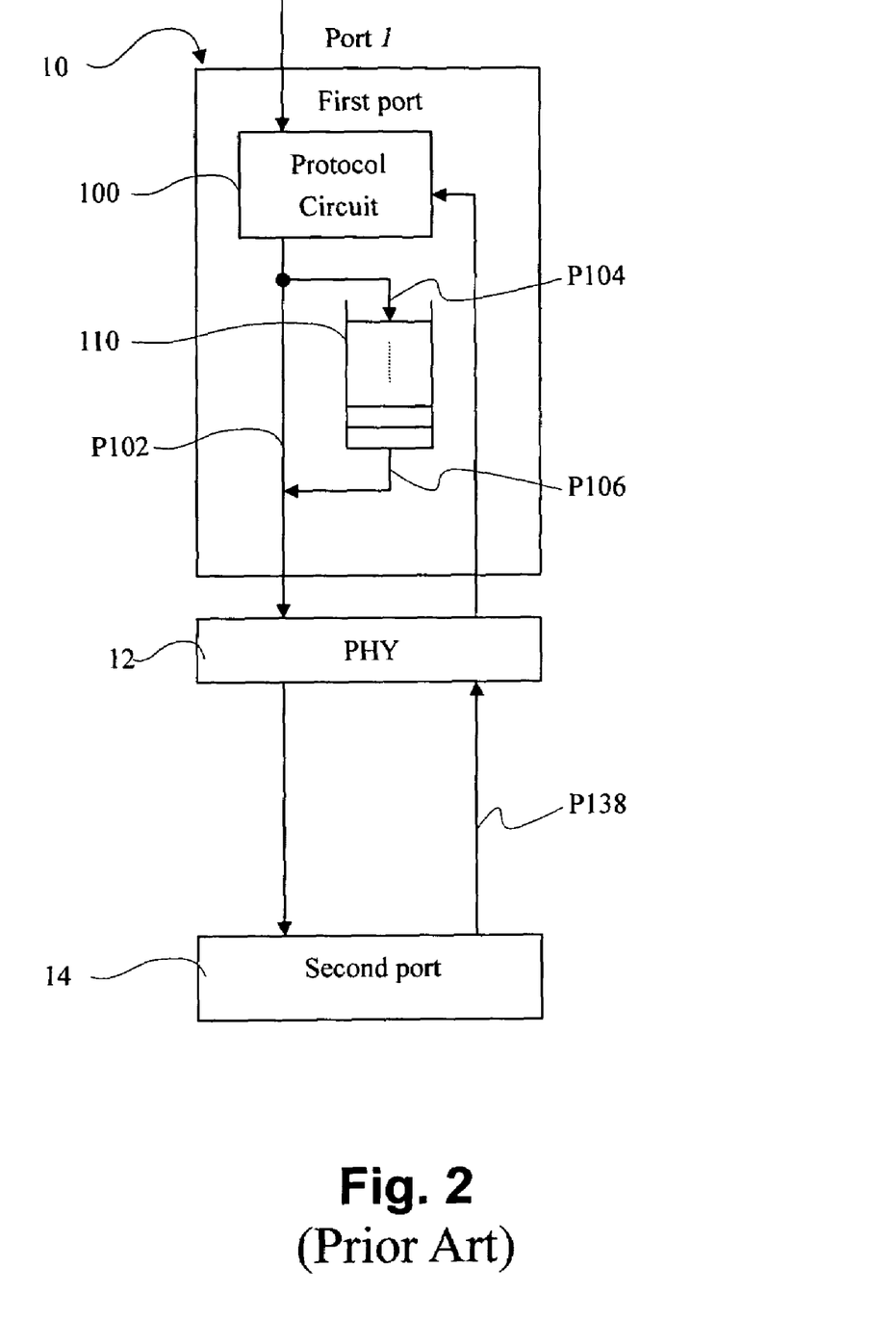
FIG. 2 illustrates a schematic structural diagram of each first port according to FIGS.1A & 1B.

Further referring to FIG. 2, data transaction between each pair of first and second ports 10, 14 are presented. Meanwhile, each of the first ports 10 has a protocol circuit 100 and a retry buffer (RB) 110 individually owned by itself, and the protocol circuit is used to control the retry buffer 110, PHY 12 and transmission line 13. On "merge" configuration status as shown in FIG. 1B, the protocol circuit 100 of a first port 10 as first port 1 with merged bandwidths can further control the physical layers (PHY) 12 and transmission lines 13 of the other first ports 2~N but therefore the protocol circuit 100 and retry buffer 110 of each of said other first ports 2~N would be disused.

For data-integrity support on data transaction, the protocol circuit 100 of each first port 10 needs to back a data up in the retry buffer 110 (see a numeral P104) upon data transmission P102 from the first port 10 to a corresponding second port 14. As son as the protocol circuit 100 of the first port 10 receives a non-acknowledge (NAK) message or nothing generated from the corresponding second port 14 with regard to said data within a specific period (see a numeral P138), the protocol circuit 100 orders the retry buffer 110 to resend the data from the retry buffer 110 to the second port 14 (see a numeral P106). Until the second port 14 exactly receives the data in integrity and correspondingly send back a acknowledge (ACK) message, the protocol circuit 100 orders the retry buffer 100 to clean said data thereon. However, as long as the retry buffer 100 is full of data, the first port 10 would pause to transmit data. Sometimes the data communication is well and steady but a retry buffer with lower volume still may cause throttling of data transmission.

Figure 3A:
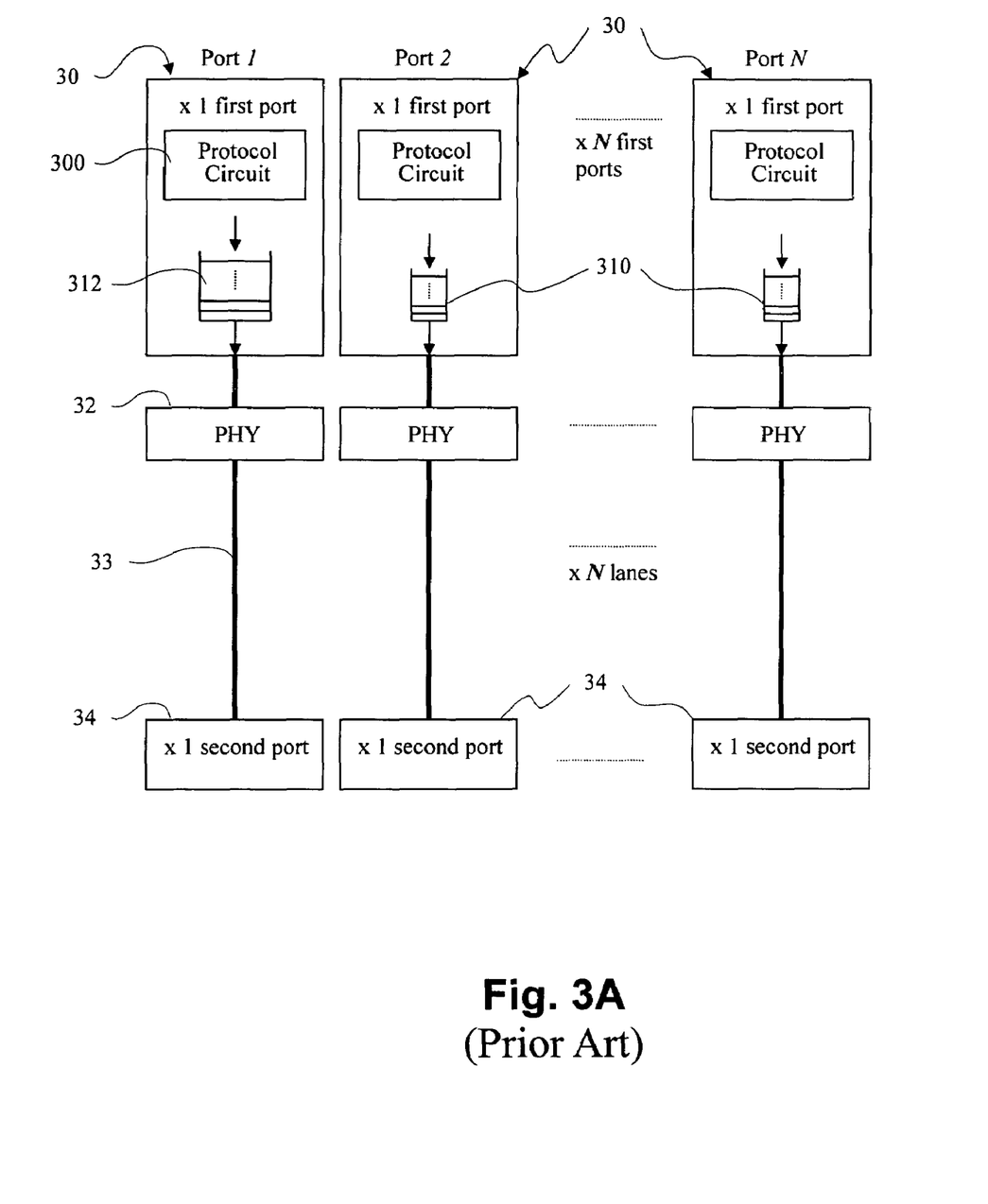
FIG. 3A illustrates a schematic diagram of data transaction between a plurality of first and second data transmission ports of a computerized system according to the prior art, which presents configuration of each first port disposed with an enlarged retry buffer on "split" status.
Figure 3B:
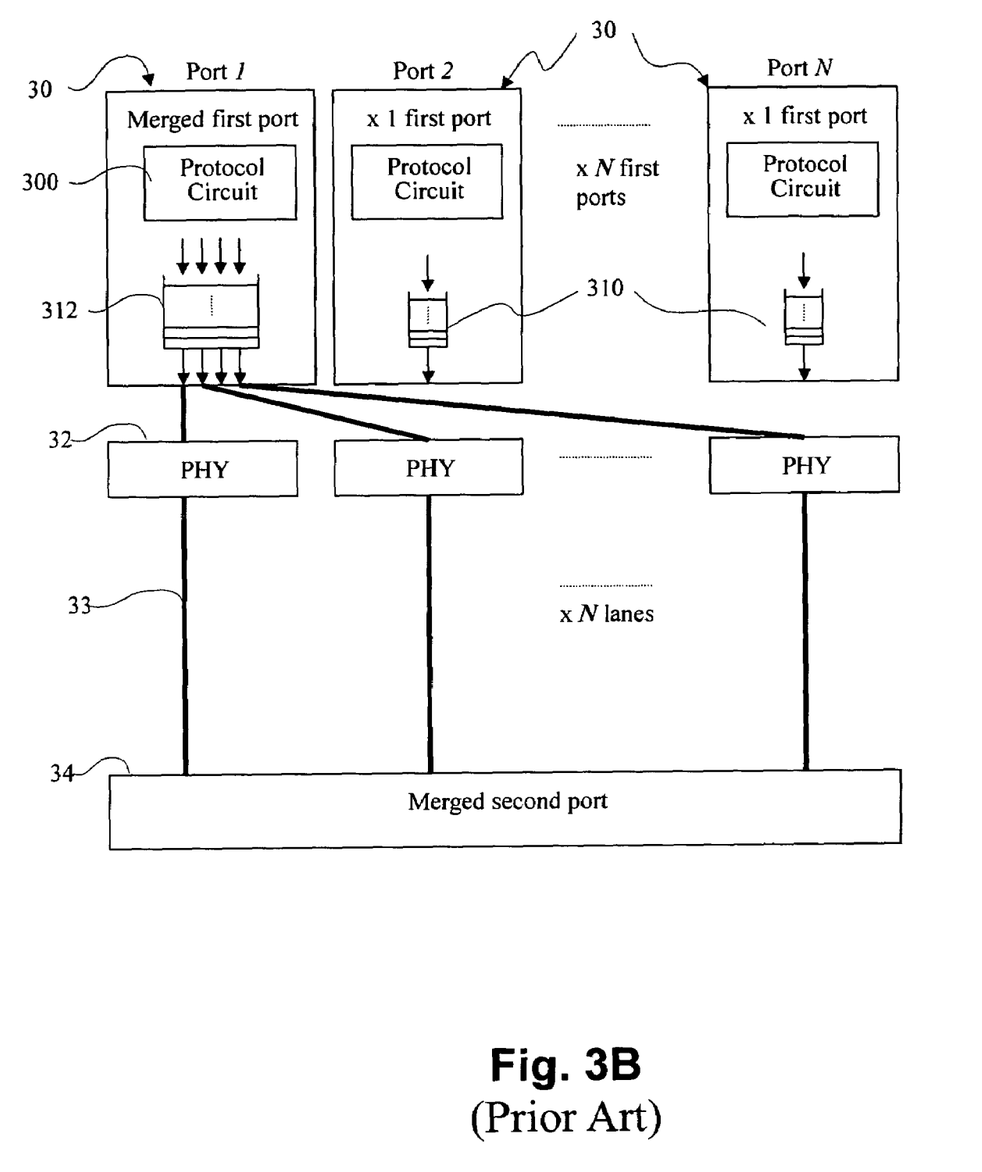
FIG. 3B illustrates a schematic diagram of data transaction between a plurality of first and second data transmission ports of a computerized system according to the prior art, which presents configuration of all of the first ports disposed with enlarged retry buffers on "merge" status.

As known, sufficient volume of a retry buffer has a direct ration with respect to either bandwidth of a data transmission port or a response time of ACK. While required bandwidth is increased, a solution of either enlarging retry buffer volume or shortening a response time of ACK is usually adopted to avoid throttling. However, shortening of response time of ACK still has a limitation. Even though a corresponding second port exactly receives the data and sends an ACK back right away, it still needs to spend fixed time to implement internal data process and external data transmission. And, more ACK messages will occupy more bandwidths in the first port. Since a response time of ACK is decided by the second port, the storing volume of retry buffer still needs to be increased upon multiple increase of the bandwidths of the first port. Therefore, a first port 30 shown in FIG. 3A utilizes an enlarged retry buffer 312 instead of a common retry buffer 310 with smaller volume used in the other first ports 30. On "merge" configuration status, the volume of the enlarged retry buffer 312 is enough to comply with requirement of a merged multi-bandwidth as shown in FIG. 3B. However, the enlarged retry buffer 312 of the first port 30 that returns to the "split" configuration status shown in FIG. 3A would be useless and waste hardware cost.

SUMMARY OF INVENTION

To solve aforementioned problems, it is therefore a primary objective of the present invention to provide re-configurable data transmission ports with data-integrity transaction controlling unit and method for performing the same, which is capable of configuring a retry buffer owned by a specific data transmission port and some retry buffers owned but disused by other data transmission ports into a buffer group with merging of storing spaces of configured retry buffers after the above-mentioned ports are configured with merging of multi bandwidths. Therefore, the specific data transmission port with merging of multi bandwidths of other configured ports does not need replacement of an enlarged retry buffer and can achieve hardware cost savings very much.

To obtain aforementioned objective, the present invention discloses re-configurable data transmission ports with data-integrity transaction controlling unit. The controlling unit further includes a port-configuration detecting mechanism and a buffer-configuration subunit. The port-configuration detecting mechanism can inspect configuration status of all of the first ports on variance of data transmission bandwidths, e.g. "merge" or "spilt" status. The buffer-configuration subunit upon different configuration status of each first port configures each corresponding retry buffer. When a specific first port on "merge" status with merging of multiple bandwidths of the other first ports, the buffer-configuration subunit can configure the retry buffer owned by the specific first port and the retry buffers owned but disused by the other first ports to constitute a buffer group with merging of storing spaces of the configured retry buffers. The controlling unit sequentially and completely backs up a data on the buffer group with merging of storing spaces upon the data is transmitted from the specific first port to a corresponding second port. If the specific first port receives a non-acknowledge (NAK) message or nothing from the corresponding second port within a specific period, the subunit retransmit the data from the buffer group to the corresponding second port. If the specific first port exactly receives an acknowledge (ACK) message from the corresponding second port, the subunit clean the data within the buffer group.

Beside, the present invention further discloses a method for performing data integrity transaction between a plurality of first and second ports of a computerized system, comprising the following steps:

detecting configuration status of all of the first ports with variance of data transmission bandwidths, e.g. "split" or "merge" status;

determining one data transmission path based on different configuration status of the first ports;

enacting at least one first port with individual bandwidth on functions as prior art if the first port is configured on "split" status;

enacting one specific first port with merged multi-bandwidths to receive a data, accompanying implementation of controlling at least an adjacent retry buffer owned but disused by the other first port if the specific first port is configured on "merge" status;

reconfiguring a main retry buffer owned by the merging-bandwidth first port and the at least adjacent retry buffer in accordance with configuration of the first ports to constitute a buffer group with merging of storing spaces of the reconfigured retry buffers;

transmitting the data from the merging-bandwidth first port to a corresponding second port;

sequentially and completely backing the data up to the merged storing space of the reconfigured buffer group;

determining whether the specific first port receives a ACK or NAK message from the second port or not;

resending the data from the reconfigured buffer group if the specific first port receives a NAK message or nothing from the corresponding second port with regard to the data within a specific period; and clearing the data stored within the reconfigured buffer group if the specific first port receives an ACK message from the corresponding second port with regard to the data.

These and other objectives of the present invention will no doubt become obvious to those of ordinary skill in the art after reading the following detailed description of the preferred embodiment that is illustrated in the various figures and drawings.

DETAILED DESCRIPTION

Figure 4A:
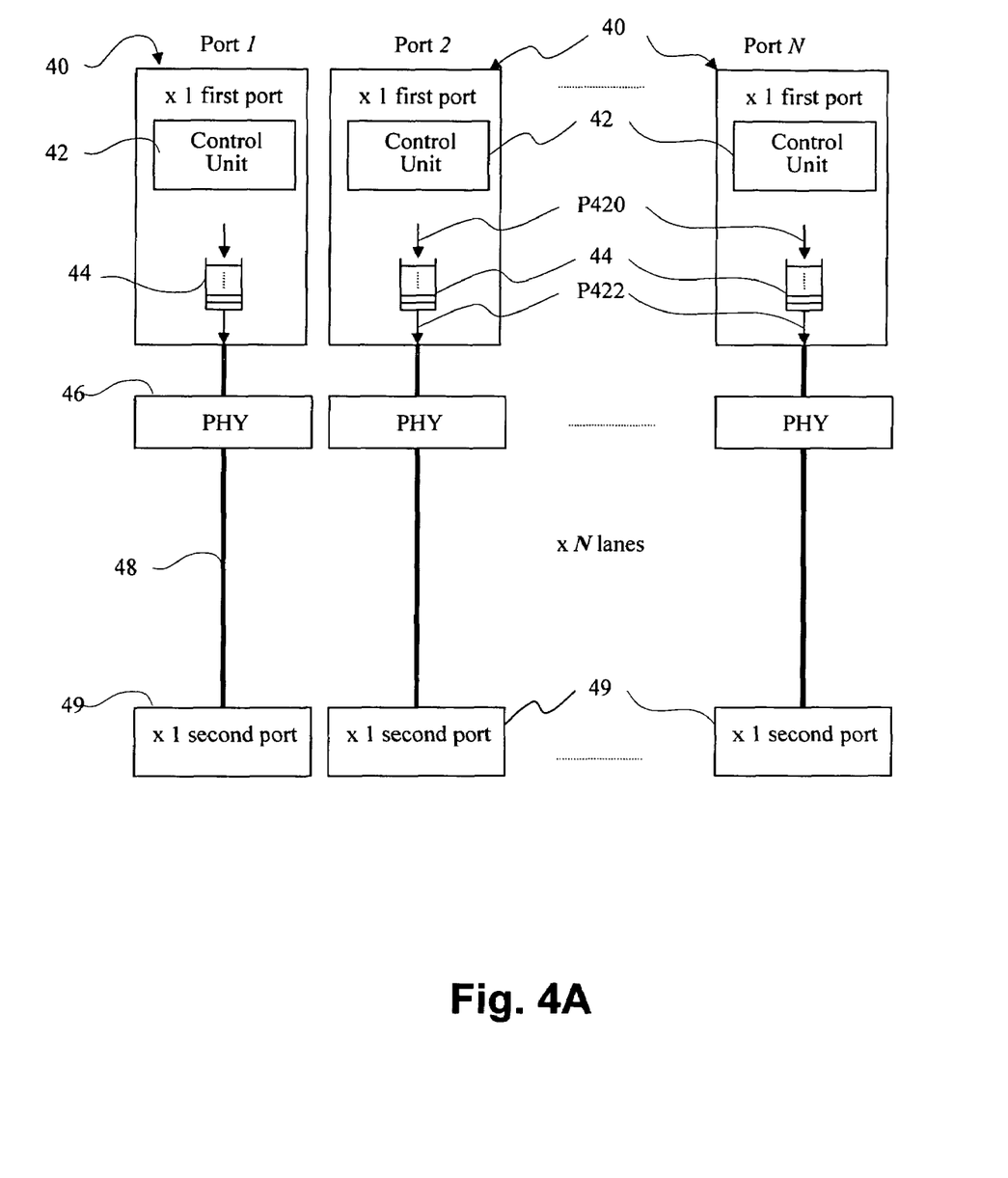
FIG. 4A illustrates a schematic diagram of data transaction between a plurality of first and second data transmission ports of a computerized system according to a first preferred embodiment of the present invention, which presents configuration of each first port disposed with a controlling unit on "merge" status.
Figure 4B:
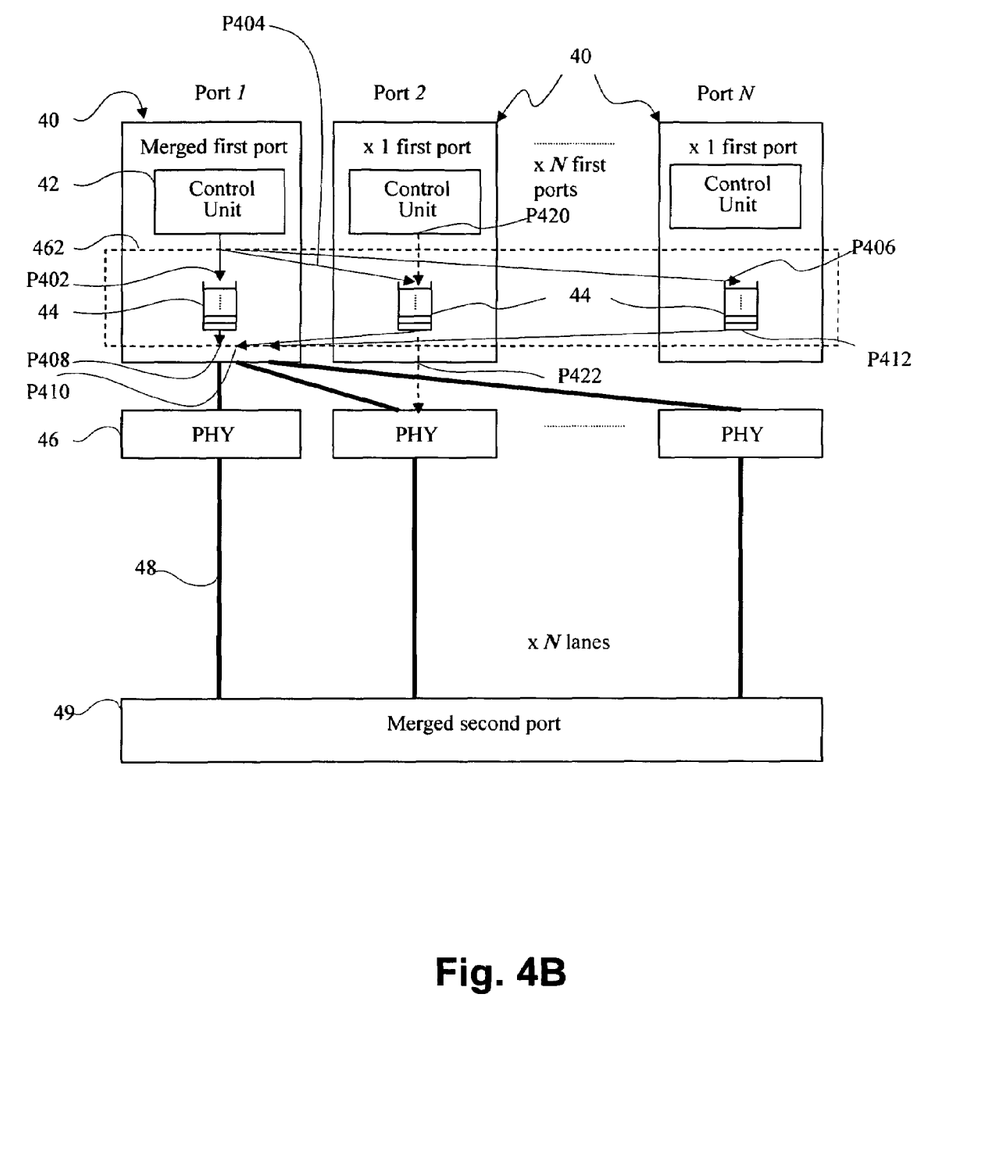
FIG. 4B illustrates a schematic diagram of data transaction between a plurality of first and second data transmission ports of a computerized system according to the first preferred embodiment of the present invention, which presents configuration of all of the first ports disposed with controlling units on "merge" status.

Please referring to FIGS. 4A & 4B, a plurality of first and second ports 40, 49 of a computerized system, according to a first preferred embodiment of the present invention, respectively implement data transactions with each other via a physical layer (PHY) 46 and a transmission line 48. A data-integrity transaction controlling unit 42 is disposed within each of the plurality of first ports 40 to control each corresponding retry buffer 44.

Figure 5:
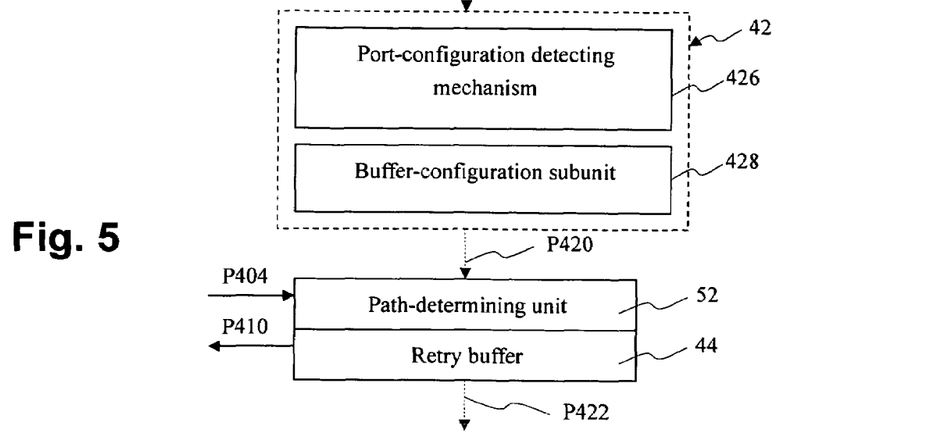
FIG. 5 illustrates a schematic structural diagram of a first port diagram according to the first preferred embodiment of the present invention.

Referring to FIG. 5, the data-integrity transaction controlling unit 42 further includes a port-configuration detecting mechanism 426 and a buffer-configuration subunit 428. Meanwhile, the port-configuration detecting mechanism 426 is used to inspect configuration status of all of the first ports 40 on variance of data transmission bandwidths, e.g. "merge" or "spilt" status. The detecting mechanism 426 may be trigged by a register generated for configuration status of the first port with bandwidth variances. According to the present invention, the controlling unit 42 is capable of being implemented in either a software or hardware types.

The buffer-configuration subunit 428 upon either "split" or "merge" configuration status of each first port 40 decides configuration of each of the corresponding retry buffers 44. As "merge" status shown in FIG. 4B, a specific first port (1) 40 is initially configured with merges of multiple bandwidths of the other first ports (1~N) 40. Then the buffer-configuration subunit 428 follows up to configure the retry buffer 44 owned by the specific first port 1 and the retry buffers owned but disused by the other first ports (2~N) 40 to constitute a buffer group 462 with merging of storing spaces of all of the configured retry buffers 44. The controlling unit 42 can sequentially and completely back up a data on the buffer group 462 with merging of storing spaces (see numerals P402, P404 & P406) upon the data is transmitted from the specific first port (1) 40 to a corresponding second port 49. As soon as the specific first port (1) 40 receives a non-acknowledge (NAK) message or nothing generated from the corresponding second port 49 with regard to said data within a specific period, the subunit 428 retransmit all of the data from the buffer group 462 to the corresponding second port 49 (see numerals P408, P410 & P412). As soon as the specific first port (1) 40 exactly receives an acknowledge (ACK) message from the corresponding second port 49 with respect to said data within a specific period, the subunit 428 would clean the data on the buffer group 462. According to the present invention, the buffer-configuration subunit 428 can further includes a protocol circuit that is enacted by the subunit 428 to control the retry buffers of the specific first port and the other first port to constitute the buffer group 462. As "split" status shown in FIG. 4A, the controlling unit 42 of each first port 40 with individual bandwidth functions as the same as the prior art.

However, to switch different data transmission path upon different configuration status of each first port 40, a path-determining unit 52, e.g. a multiplexer (MUX), is disposed on a data entry of the retry buffer 44 of each first port 40. For example, the path-determining unit 52 of the first port (2) 40 shown in FIGS. 4A & 4B, is enacted by the buffer-configuration subunit 428 to receive the data from either the specific first port (1) 40 (see numerals P404 & P406) or the other first port (2) 40 (see numerals P420 & P422) for storage of the data within the retry buffer 44 of the other first port (2) 40.

Figure 6:
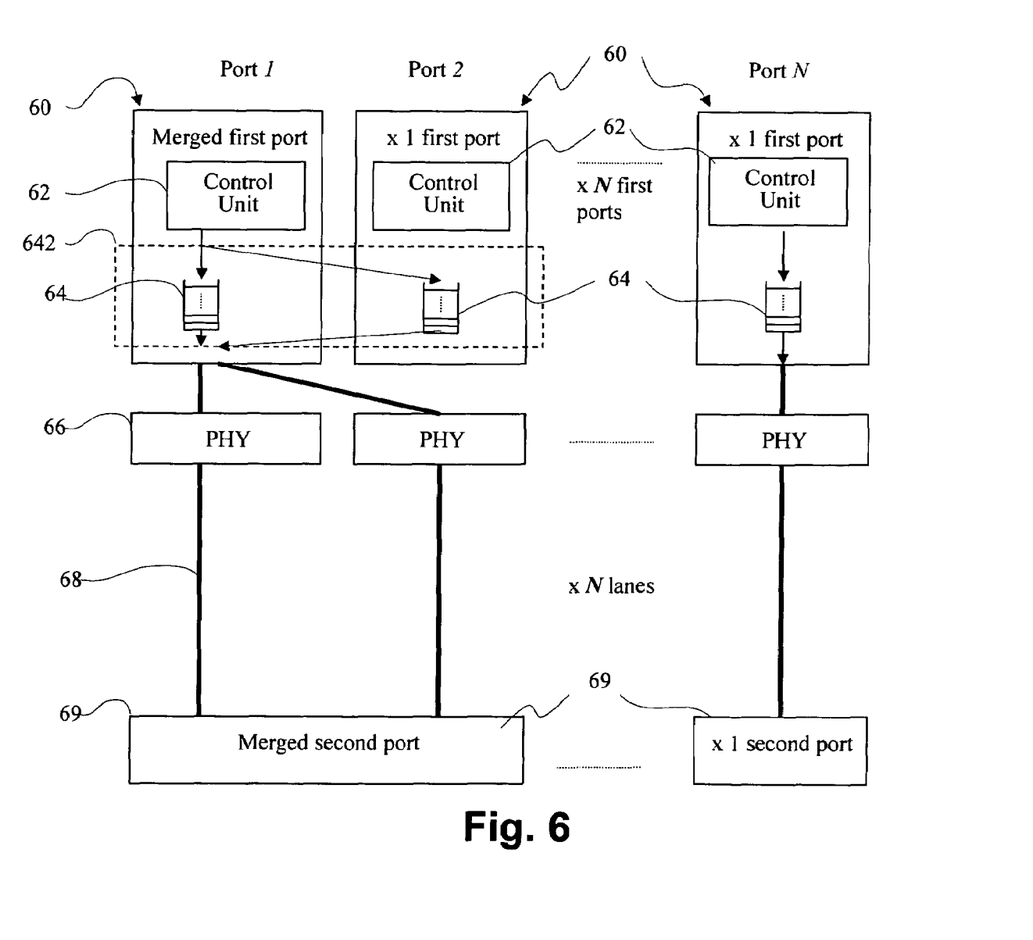
FIG. 6 illustrates a schematic diagram of data transaction between a plurality of first and second data transmission ports of a computerized system according to a second preferred embodiment of the present invention, which presents reconfiguration of some of the first ports disposed with controlling units on "merge" status.

Further referring to FIG. 6, a plurality of first ports 60 according to a second preferred embodiment of the present invention are reconfigured into a first port (1) 60 with merging of multi-bandwidths of the other first port (2) 60, and a first port (N) 60 with individual bandwidth. As the same theory as aforementioned first preferred embodiment, a control unit 62 of the first port (1) 60 would reconfigure the retry buffer 64 owned the first port (1) 60 and the other retry buffer 64 owned but disused by the first port (2) 60 to constitute a different buffer group 642 with different sizes of merged storing spaces. However, the controlling unit 62 of the first port (N) 60 reconfigured with individual bandwidth remains on controlling just its individual retry buffer 64.

Figure 7:
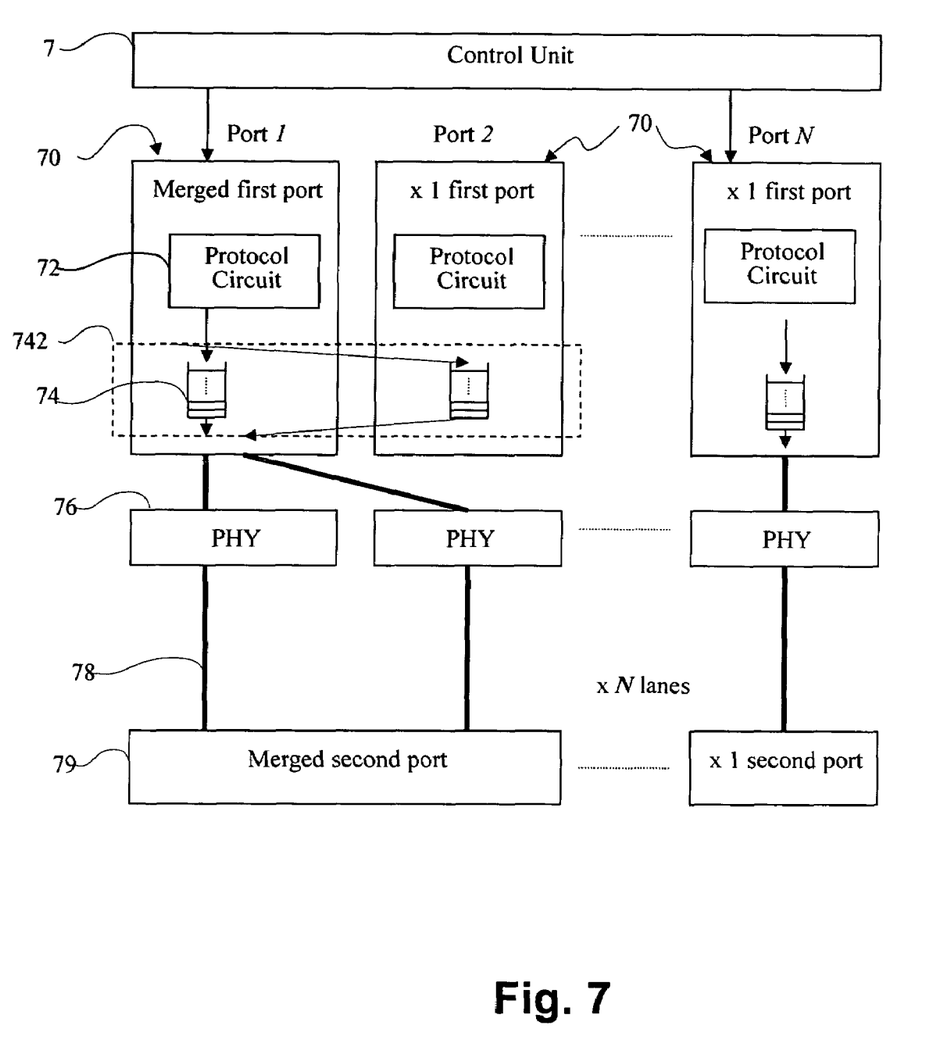
FIG. 7 illustrates a schematic diagram of data transaction between a plurality of first and second data transmission ports of a computerized system according to a third preferred embodiment of the present invention, which presents a controlling unit disposed out of the first ports on "merge" status.

Further referring to FIG. 7, a plurality of first ports 70 according to a third preferred embodiment of the present invention are reconfigured into a first port (1) 70 with merging of bandwidth of the other first port (2) 70, and a first port (N) 70 with individual bandwidth. There is only one difference between the second and third preferred embodiments that a controlling unit 7 of the third preferred embodiment disposed out of each first port 70 to enact a protocol circuit 72 for configuration of several retry buffers 74 into a buffer group 742.

Figure 8:
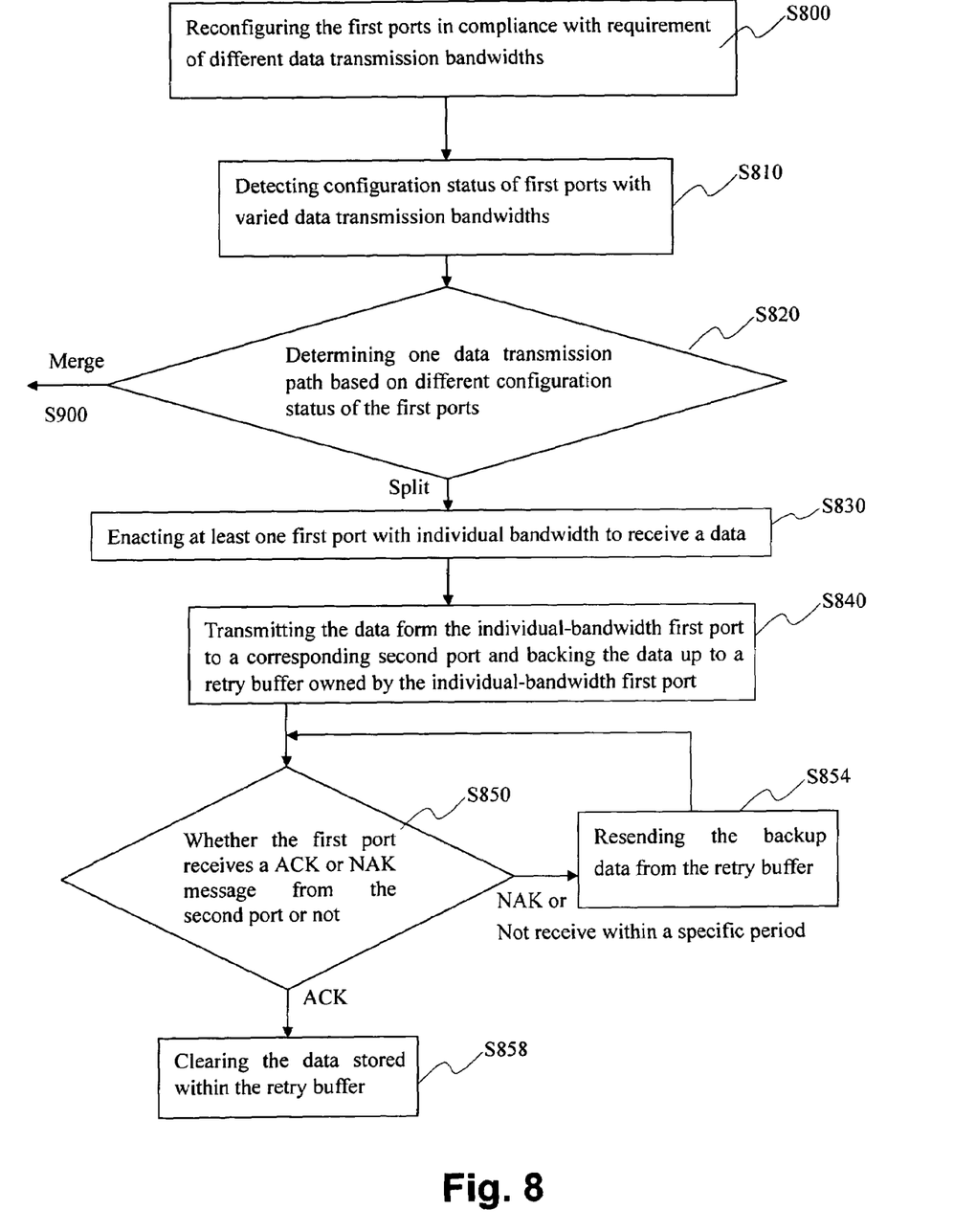
FIGS. 8 & 9 illustrate a method according to the present invention, which performs data integrity transaction.
Figure 9:
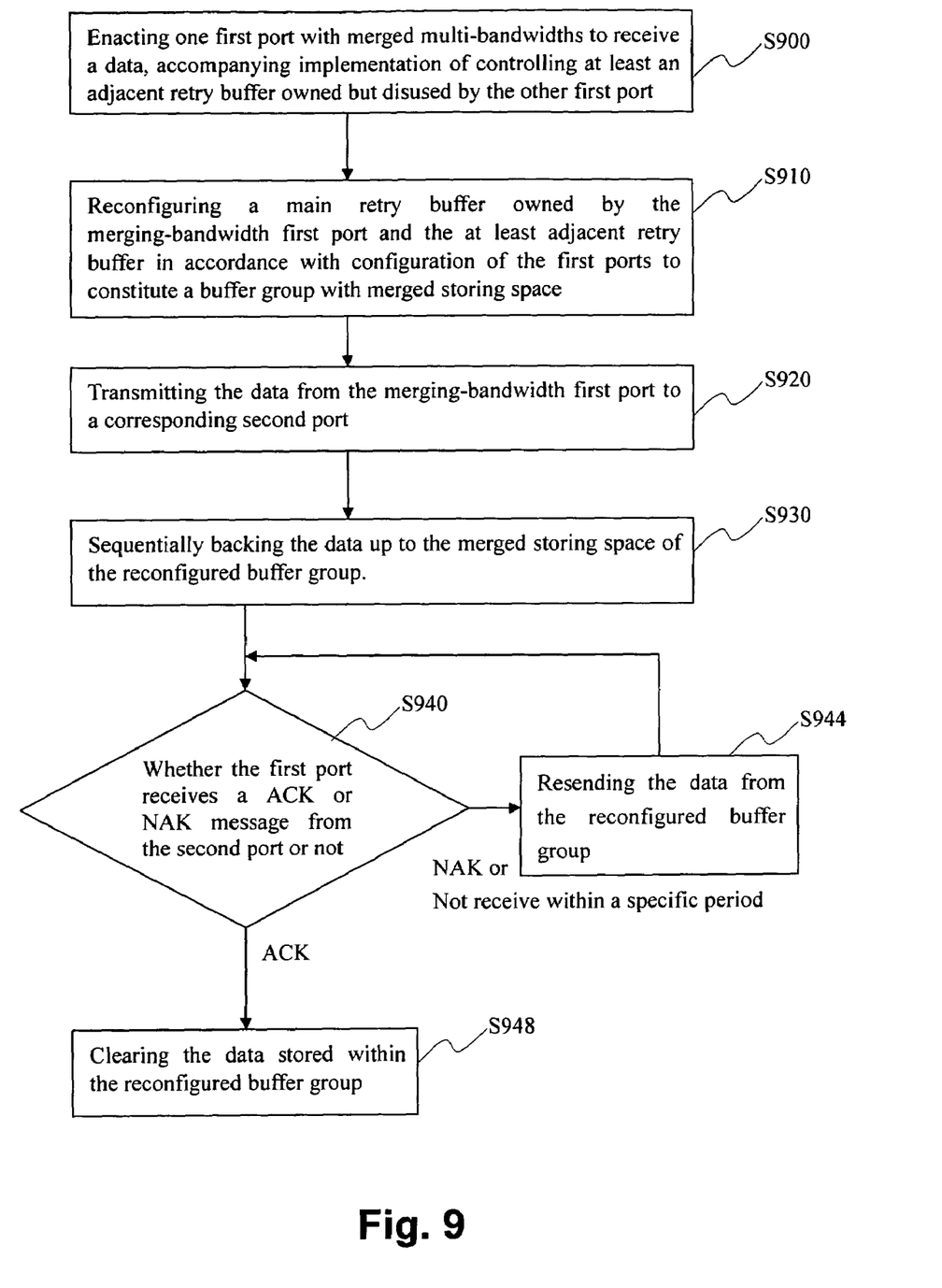

Beside according to the present invention, a method for performing a data integrity transaction between a plurality of first and second ports of a computerized system is presented in FIGS. 8 & 9. The method comprises the following steps:

In step S800, reconfiguring all of the first ports in compliance with requirement of different data transmission bandwidths;

In step S810, detecting configuration status of the first ports with variance of data transmission bandwidths, e.g. "split" or "merge" status;

In step S820, determining one data transmission path based on different configuration status of the first ports. If the first port is configured on "split" status, the following implementation enters the step S830; otherwise on the "merge" status, the following implementation enters the step S900;

In step S830, enacting at least one first port with individual bandwidth to receive a data if the first port is configured on "split" status;

In step S840, transmitting the data form the individual-bandwidth first port to a corresponding second port and backing the data up to a retry buffer owned by the individual-bandwidth first port;

In step S850, determining whether the first port receives an ACK or a NAK message from the second port or not within s specific period;

In step S854, resending the backup data from the retry buffer if the first port receives a NAK message or nothing generated from the corresponding second port;

In step S858, clearing the data stored within the retry buffer if the first port exactly receives an ACK message generated from the corresponding second port;

In step S900, enacting one specific first port with merged multi-bandwidths to receive a data, accompanying implementation of controlling at least an adjacent retry buffer owned but disused by the other first port if the first port is configured on "merge" status;

In step S910, reconfiguring a main retry buffer owned by the merging-bandwidth first port and the at least adjacent retry buffer in accordance with configuration of the first ports to constitute a buffer group with merging of storing spaces of the reconfigured retry buffers;

In step S920, transmitting the data from the merging-bandwidth first port to a corresponding second port;

In step S930, sequentially and completely backing the data up to the merged storing space of the reconfigured buffer group for storage;

In step S940, determining whether the specific first port receives an ACK or NAK message generated from the second port or not;

In step S944, resending the data from the reconfigured buffer group if the specific first port receives a NAK message or nothing generated from the corresponding second port with regard to the data; and In step S948, clearing the data stored within the reconfigured buffer group if the specific first port exactly receives an ACK message from the corresponding second port with regard to the data.

In conclusion, the data transmission ports with data-integrity transaction controlling unit, according to the present invention, can reconfigure a retry buffer owned by the specific first port and the other retry buffers owned but disused by other first ports into a buffer group with different sizes of merging storing spaces of said reconfigured retry buffers upon configuration status of the above-mentioned first ports with merging of multi bandwidths. Each data transmission port configured with merging of multi bandwidths of other configured ports does not need to enlarge the volume of a owned retry buffer and therefore can achieve hardware cost savings very much.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for performing data integrity transaction between a plurality of first ports and at least a second port wherein each of the first ports owns a corresponding retry buffer and an individual bandwidth, comprising the steps of:

configuring at least a specific first port to merge bandwidth of the other first port to achieve variable merged multi bandwidths;

controlling a retry buffer of the specific first port and an adjacent retry buffer owned but disused by the other first port to constitute a buffer group with different size of merging storing spaces of the controlled retry buffers;

transmitting a data from the specific first port to a corresponding second port and backing the data up to the merged storing space of the buffer group;

resending the data from the merged storing space of the buffer group as soon as the specific first port receives either a non-acknowledge message or nothing from the corresponding second port with respect to said data within a specific period; and clearing the data stored within the merged storing space of the buffer group as soon as the specific first port receives an acknowledge message from the corresponding second port with respect to the data within a specific period.

2. The method as described in claim 1, further comprising the step of: detecting configurations status of all of the first ports on variance of data transmission bandwidths.

3. The method as described in claim 1, further comprising the step of: enacting the specific first port to receive the data, accompanying implementation of controlling the retry buffer of the specific first port and the adjacent retry buffer owned but disused by the other first port to constitute said buffer group.

4. The method as described in claim 1, further comprising the step of: determining a data transmission path through each first port upon different configuration status of all of the first ports.

5. The method as described in claim 1, further comprising the step of: reconfiguring the retry buffers of at least some of the plurality of first ports to constitute a re-configurable buffer group with merging of storing spaces of the reconfigured retry buffers upon reconfiguration of said first ports with merging of bandwidths.

6. A method for performing data integrity transaction between a plurality of first ports and at least a second port wherein each of the first ports owns a corresponding retry buffer and an individual bandwidth, comprising the steps of:

configuring the retry buffers individually owned by at least some of the plurality of first ports to constitute a buffer group with different size of merging storing spaces of the reconfigured retry buffers where stores a data transmitted from one of the at least some first ports to a corresponding second port after the at least some first ports are configured with variable merged multi bandwidths; and configuring the retry buffer owned by at least one of the plurality of first ports to store thereon a data transmitted from the at least one first port to a corresponding second port after the at least one first port is reconfigured with individual bandwidth.

7. The method as described in claim 6, further comprising the step of: resending the data from the merged storing space of the buffer group as long as the corresponding second port transmit back either a non-acknowledge message or nothing with response to the data within a specific period after the at least some first ports are configured with the variable merged multi bandwidths.

8. The method as described in claim 7, further comprising the step of: clearing the data stored within the merged storing space of the buffer group as long as the corresponding second port transmit back a acknowledge message with response to the data within a specific period after the at least some first ports are configured with the variable merged multi bandwidths.

9. A method for performing data integrity transaction between a plurality of first ports and at least a second port wherein each of the first ports owns a corresponding retry buffer and an individual bandwidth, comprising the steps of:

receiving a data from a specific first port to store the data within a storing space covering the retry buffers of the specific first port and the other first port after the specific first port is configured on merging bandwidth of the other first port to achieve variable merged multi bandwidths; and receiving a data from the other first port to store the data within the retry buffer of the other first port after the other first port is configured with individual bandwidth.

10. The method as described in claim 9, further comprising the step of: determining a data transmission path to the retry buffer of each first port upon different configuration status of all of the first ports on variance of bandwidths.

11. The method as described in claim 10, further comprising the step of: enacting a path-determining unit to determine data transmission path to receive the data from either the specific first port or the other first port to store the data within the retry buffer of the other first port.

12. A method for performing data integrity transaction between a plurality of first ports and at least a second port wherein each of the first ports owns a corresponding retry buffer and an individual bandwidth, comprising the steps of:

configuring a specific first port on merging bandwidth of the other first port to achieve a variable merged multi bandwidths;

resending a backup data from a storing space covering the retry buffers of the specific first port and the other first port to enter the corresponding second port after the corresponding second port transmits either a non-acknowledge message or nothing to the specific first port; and cleaning the backup data within the storing space after the corresponding second port transmits an acknowledge message to the specific first port.

13. The method as described in claim 12, further comprising the step of: resending a backup data from the retry buffer of the other first port to enter the corresponding second port as soon as the corresponding second port with respect to the data transmits an acknowledge message to the specific first port after the other first port is reconfigured with individual bandwidth.

14. A data-integrity transaction controlling unit implemented in a hardware type for a plurality of first ports each disposed with a dedicated retry buffer and at least one second port, comprising:

a port-configuration detecting mechanism inspecting configurations status of the first ports on variance of data transmission bandwidths;

a buffer-configuration subunit, upon configurations status of a specific first port with merging of bandwidth of at least one of the other first ports, controlling the retry buffers of the specific first port and the other first port to constitute a buffer group with different size of merging storing spaces of the controlled retry buffers where stores a data transmitted from one of said merging-bandwidth first ports to a corresponding second port thereby retransmitting the data from the buffer group to the corresponding second port after the corresponding second port transmits back either a non-acknowledge message or nothing to the specific first port.

15. The controlling unit as described in claim 14 wherein the port-configuration detecting mechanism inspects a register generated for different configuration status of the first port with bandwidth variances.

16. The controlling unit as described in claim 14 wherein the buffer-configuration subunit further enacts a protocol circuit on controlling the retry buffers of the specific first port and the other first port to constitute the buffer group.

17. The controlling unit as described in claim 14 wherein the buffer-configuration subunit further enacts a path-determining unit on receiving the data from either the specific first port or the other first port to store the data within the retry buffer of the other first port.

18. The controlling unit as described in claim 17 wherein the path-determining unit is disposed on a data entry of the retry buffer of each first port.

19. The controlling unit as described in claim 18 wherein the path-determining unit is a multiplexer.

* * * * *